United States Patent
Lu et al.

(10) Patent No.: US 8,701,207 B2
(45) Date of Patent: Apr. 15, 2014

(54) METHOD, DEVICE AND SYSTEM FOR PROTECTING SOFTWARE

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 202 days.

(21) Appl. No.: 12/866,940

(22) PCT Filed: Jun. 25, 2010

(86) PCT No.: PCT/CN2010/074465
§ 371 (c)(1),
(2), (4) Date: Aug. 10, 2010

(87) PCT Pub. No.: WO2011/000281
PCT Pub. Date: Jan. 6, 2011

(65) Prior Publication Data
US 2011/0119766 A1   May 19, 2011

(30) Foreign Application Priority Data
Jul. 2, 2009 (CN) .......................... 2009 1 0088379

(51) Int. Cl.
*G06F 21/00* (2013.01)
(52) U.S. Cl.
USPC ........................................... 726/29; 713/324
(58) Field of Classification Search
None
See application file for complete search history.

(56) References Cited

U.S. PATENT DOCUMENTS

| | | | | |
|---|---|---|---|---|
| 5,444,780 | A * | 8/1995 | Hartman, Jr. | 380/30 |
| 5,569,903 | A * | 10/1996 | Matsubara | 235/492 |
| 5,857,146 | A * | 1/1999 | Kido | 340/7.38 |
| 6,473,607 | B1 * | 10/2002 | Shohara et al. | 455/343.1 |
| 6,745,338 | B1 * | 6/2004 | Williams | 713/501 |
| 6,823,456 | B1 * | 11/2004 | Dan et al. | 713/178 |
| 6,865,678 | B2 * | 3/2005 | Fischer | 713/176 |
| 7,302,594 | B2 * | 11/2007 | Di Benedetto | 713/300 |
| 7,539,863 | B2 * | 5/2009 | Phillips et al. | 713/168 |
| 7,765,423 | B2 * | 7/2010 | Madar et al. | 713/502 |
| 8,176,564 | B2 * | 5/2012 | Frank et al. | 726/27 |
| 8,499,161 | B2 * | 7/2013 | Cha et al. | 713/178 |
| 8,544,105 | B2 * | 9/2013 | Mclean et al. | 726/27 |
| 2002/0082997 | A1 * | 6/2002 | Kobata et al. | 705/51 |
| 2003/0093705 | A1 * | 5/2003 | Kriz et al. | 713/600 |
| 2004/0093505 | A1 * | 5/2004 | Hatakeyama et al. | 713/189 |
| 2006/0248596 | A1 * | 11/2006 | Jain et al. | 726/27 |
| 2007/0100701 | A1 * | 5/2007 | Boccon-Gibod et al. | 705/21 |
| 2010/0011214 | A1 * | 1/2010 | Cha et al. | 713/175 |

FOREIGN PATENT DOCUMENTS

CN     1834977 A         9/2006
CN   101241531 A    *    8/2008

* cited by examiner

*Primary Examiner* — Michael R Vaughan
(74) *Attorney, Agent, or Firm* — Hammer & Associates, P.C.

(57) ABSTRACT

The invention, related to information security field, discloses a method for protecting software, and device and system thereof. The method includes that a security device is connected with a terminal device; the security device receives service instruction, determines whether the clock inside the security device is activated, reads the current time of the clock and determines whether the current time is valid; if so, the security device executes the service instruction and returns the executing result to the terminal device; otherwise, the security device returns false result to the terminal device. The invention provides more secure service to the protected software, meanwhile, extends lifetime of the security device.

15 Claims, 3 Drawing Sheets

METHOD, DEVICE AND SYSTEM FOR PROTECTING SOFTWARE

FIELD OF THE INVENTION

The invention relates to the information security field, and more particularly, the invention relates to a method for protecting software, as well as, a device and a system thereof.

BACKGROUND OF THE INVENTION

In the prior art, the popular method for protecting the right to use software is by using encrypting tool, like token. With secured smart card chip and advanced encryption technology, the token has some ability of storing and computing. The token is widely used in the field of protecting software because the token is hard to be illegally decrypted and copied.

At present, the general way to protect software is that protecting software with token. The software is protected by inserting a token into a computer via communication interface and cooperating with specified software as well. So a user cannot run the software without the token, and then the software is protected.

But the inventors have found some disadvantages, as follows, in the prior art.

The time limit function and date limit function of a token are general, which is convenient to control the trial time of the software. But the token in prior art cannot record the start time of using the software and cannot limit the start time and expiring time of using the software. In addition, the battery power for the token in the prior art is always wasted.

SUMMARY OF THE INVENTION

The object of the present invention is to provide to a method for protecting software, as well as a device and a system thereof, which has the time limit function and date limit function of a token.

Thus, according to one aspect of the present invention, there provides a method for protecting software, wherein said method comprises connecting, by a security device in which time limit information is stored, with a terminal device;

sending, by a protected software stored in the terminal device, a predetermined service instruction to the security device; and receiving, by the security device, the predetermined service instruction and determining whether the clock inside the security device is activated;

if the clock is not activated, activating the clock, reading the current time of the clock and determining whether the current time is valid by the security device;

if the current time is valid, executing the service instruction and returning the executing result to the terminal device by the security device;

if the current time is not valid, returning a false result to the terminal device by the security device;

if the clock is activated, reading the current time of the clock and determining whether the current time is valid by the security device;

if the current time is valid, executing the service instruction and returning the executing result to the terminal device by the security device; and if the current time is not valid, returning false result to the terminal device by the security device.

According to another aspect of the present invention, there provides a device for protecting software, wherein the device comprises a connecting module adapted to connect with a terminal device;

a receiving module adapted to receive predetermined service instruction sent from protected software stored in the terminal device;

an activating determining module adapted to determine whether a clock inside the security device is activated;

an activating module adapted to activate the clock if the activating determining module determines that the clock is not activated;

a reading module adapted to read the current time of clock;

a validation determining module adapted to determine whether the current time is valid; and sending module adapted to send executing result to the terminal device if the validation determining module determines that the current time is valid, or to send false result to the terminal device if the validation determining module determines that the current time is not valid.

According to another aspect of the present invention, there provides a system for protecting software, wherein the system comprises a security device and a terminal device, the security device comprises a connecting module adapted to connect with a terminal device;

a receiving module adapted to receive a predetermined service instruction sent from a protected software stored in the terminal device;

an activating determining module adapted to determine whether a clock inside the security device is activated;

an activating module adapted to activate the clock if the activating determining module determines that the clock is not activated;

a reading module adapted to read the current time of clock;

a validation determining module adapted to determine whether the current time is valid; and a sending module adapted to send executing result of the predetermined service instruction to the terminal device if the validation determining module determines that the current time is valid; and to send false result to the terminal device if the validation determining module determines that the current time is not valid;

the terminal device comprises an interface module adapted to connect with the connecting module of the terminal device;

a sending module adapted to send predetermined service instruction to the security device; and a receiving module adapted to receive executing result or false result send by the security device.

According to the present invention, a security device stores time limit information according to which the time of using the security device is limited. The security device is bound with time or date, etc. conveniently and the period of using the security device by the protected software is limited, which provides safer security to the protected software and extends the lifetime of the security device.

DETAILED DESCRIPTION OF THE PREFERRED EMBODIMENTS OF THE INVENTION

Objects, technical solutions and advantages of the invention will be easily understood by reference to the following description of embodiments when read in conjunction with the accompanying drawings.

Embodiment 1

Figure 1:
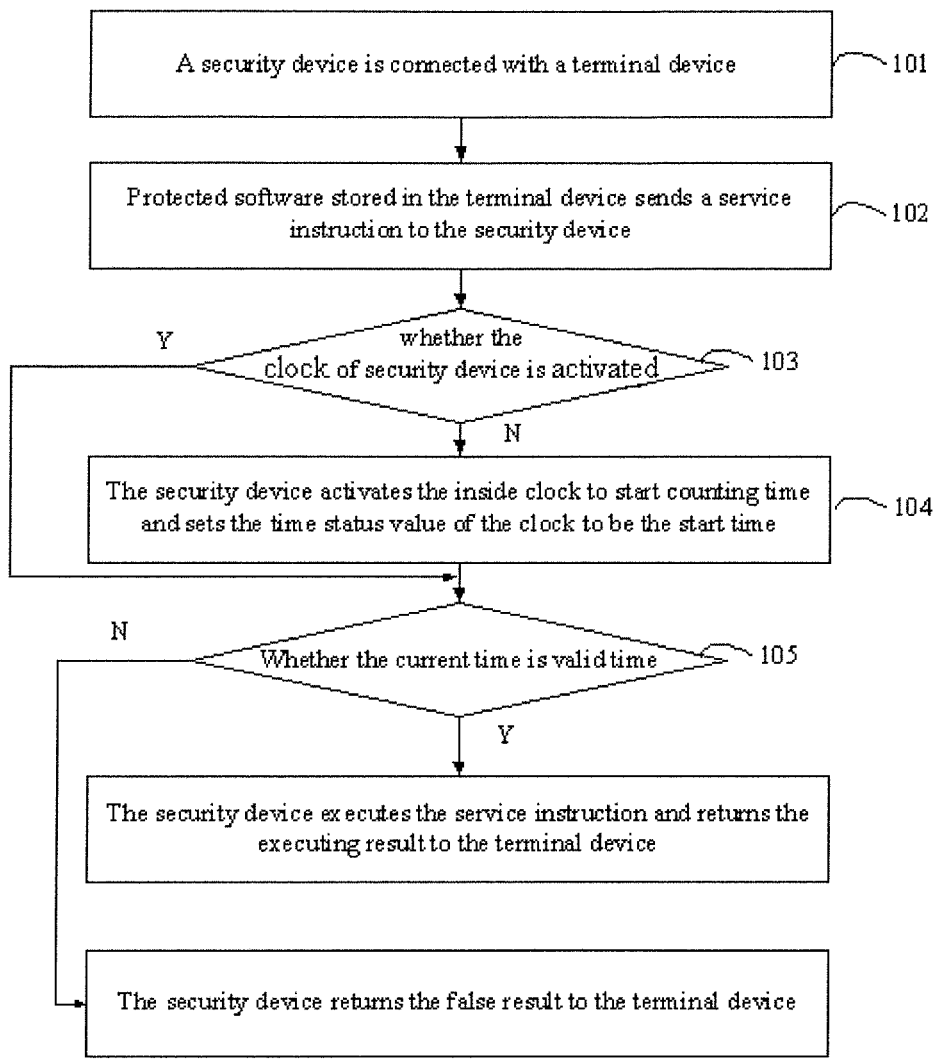
FIG. 1 is a flow chart illustrating a method for protecting software of Embodiment 1 according to the present invention.

The embodiment 1 provides a method for protecting software. Referring to FIG. 1, the method includes the following steps.

Step 101, a security device is connected with a terminal device;

In the embodiment 1, the security device is a token. The token includes a clock which is powered up by battery. The clock does not work, that is, does not count time, at the time of leaving a factory. Only if the token receives a service instruction from the terminal device, can the clock start counting time. In addition, one or more pieces of time limit information can be set up before the token leaves the factory. The time limit information is adapted by the token to implement time protecting function to protected software. The time protection function is not activated before the token leaves the factory. Only if the token receives a service instruction sent from the terminal device after the token is connected with the terminal device, can the time protecting function be activated. The service instruction is predetermined by the protected software and the token when the token leaves the factory.

In the embodiment 1, the time limit information can be a time length that the protected software using the token, for example, 10 hours.

The terminal device can be a computer, a card reader with power, RF card reader or any device that can use the token above.

Step 102, the protected software stored in the terminal device sends a service instruction to the security device;

The protected software refers to the software, of which a part of or all of the functions are modified or encrypted. In addition, the protected software can send service instruction to the security device automatically or the service instructions can be manually sent to the security device when the protected software starts the protection function.

The service instruction is predetermined by the security device and the terminal device. It can be any one of several predetermined instructions. For example, the service instruction can be a communication instruction for the terminal device and the security device, such as APDU instruction 80 10 00 00 00; and the service instruction also can be program start instruction and/or function algorithm instruction.

Furthermore, the protected software of the terminal device can send encrypted service instructions to the security device. The encryption algorithm includes but is not limit to AES (Advanced Encryption Standard) or DES (Data Encryption Standard) etc.

Step 103, the security device receives the service instruction from the terminal device and determines whether the clock of security device is activated, that is, determines whether the clock of security device starts counting time;

If the clock is not activated, goes to Step 104;

If the clock is activated, go to Step 105;

Thereby, if the security device receives an encrypted service instruction, the security device decrypts the service instruction with the predetermined decryption algorithm. The predetermined algorithm includes but is not limit to AES algorithm or DES algorithm, etc.

In Step 103, the method of determining whether the clock starts counting time includes determining whether the activation flag of the clock is activation indicator (activated);

if the activation flag is not activation indicator (not activated), that is, the clock chip is disconnected from the battery, the clock does not start counting time;

if the activation flag is activation indicator (activated), that is, the clock chip is connected with the battery, the clock starts counting time.

Step 104, the security device activates its internal clock to start counting time and sets the time status value of the clock to be the start time;

It should be noted that the clock of the security device omits synchronization with the clock of the terminal device. The security device can count time according to the time of its clock.

Before the clock starts counting time, the clock does not work and a time value is stored in the clock, which is called time status value in the embodiment 1. When the clock is activated and starts counting time, the security device sets the time status value as the start time of the clock.

The embodiment 1 further includes that the security device reads the predetermined time length, for example, 10 hours, for which the protected software uses the security device and determines whether the time status value stored by the clock is 0, if the time status value is 0, the security device sets the read time length, e.g. 10 hours, as the expiring time of the clock; if the time status value is not 0, the security device sets the result, obtained by adding the time length value e.g. 10 hours, to the read time status value, as the expiring time of the clock.

Alternatively, if the security device determines that the time status value stored by the clock is not 0, the security device clears the time status value to be 0 and sets the read time length to be the expiring time of the clock.

Specifically, in the embodiment 1, the security device activates the clock in the following cases.

(1) When the clock chip of the clock is disconnected from the battery, the security device makes the clock's chip to connect with the battery;

The battery supplies power to the clock, e.g. the clock starts counting time, meanwhile, the activation flag of the clock is modified to be activation indicator (activated).

(2) When the clock chip of the clock is connected with the battery, the security device controls the clock oscillator to make the clock to start working;

the power-off pin of the clock is enabled, the clock starts counting time; meanwhile, the activation flag of the clock is modified to be activation indicator (activated).

Step 105, the security device reads current time of the clock and determines whether the current time is valid time;

If the current time is valid time, the security device executes the service instruction and returns the executing result to the terminal device; and If the current time is not valid time, the security device returns a false result to the terminal device.

Thereby, the executing result or the false result can be encrypted. The encrypted algorithm includes but is not limited to AES algorithm or DES algorithm;

In addition, the false result can be but is not limited to error or random result or the prompt that the security device is expired.

The method of determining whether the current time is valid time includes the security device calculates the difference between the current time and the start time, compares the obtained difference with the predetermined time length for which the protected software uses the security device and determines whether the difference exceeds the predetermined time length, if the difference exceeds the predetermined time length, the current time is not valid; otherwise, the current time is valid.

For example, the current time of the clock of the security device is 06:25 and the start time is 00:00; and the predetermined time length that limits the protected software to use the security device is 10 hours. Because the difference between the current time and the start time does not exceed the predetermined time length, 10 hours, the current time is valid time.

Or, the security device reads the current time and the expiring time of the clock and determines whether the read current time is before the expiring time, if the read current time is not before the expiring time, the current time is not valid; and if the read current time is before the expiring time, the current time is valid.

For example, if the current time of the clock of the security device is 10:45, and the expiring time is 10:00. The current time is valid.

It should be noted that if the clock of the security device is activated, only if the protected software stops using the security device actively or the time reaches the expiring time of the security device, can the clock stops working. If the clock is forced to stop working, the security device will be destroyed and be instructed to return information that the security device is destroyed to the terminal device.

In the embodiment 1 of the invention, the security device stores time limit information according to which the time for using the security device is limited. The security device is bound with time or date, etc. conveniently and the period of using the security device by the protected software is limited, which provides safer security to the protected software and extends the lifetime of the security device.

Embodiment 2

Figure 2:
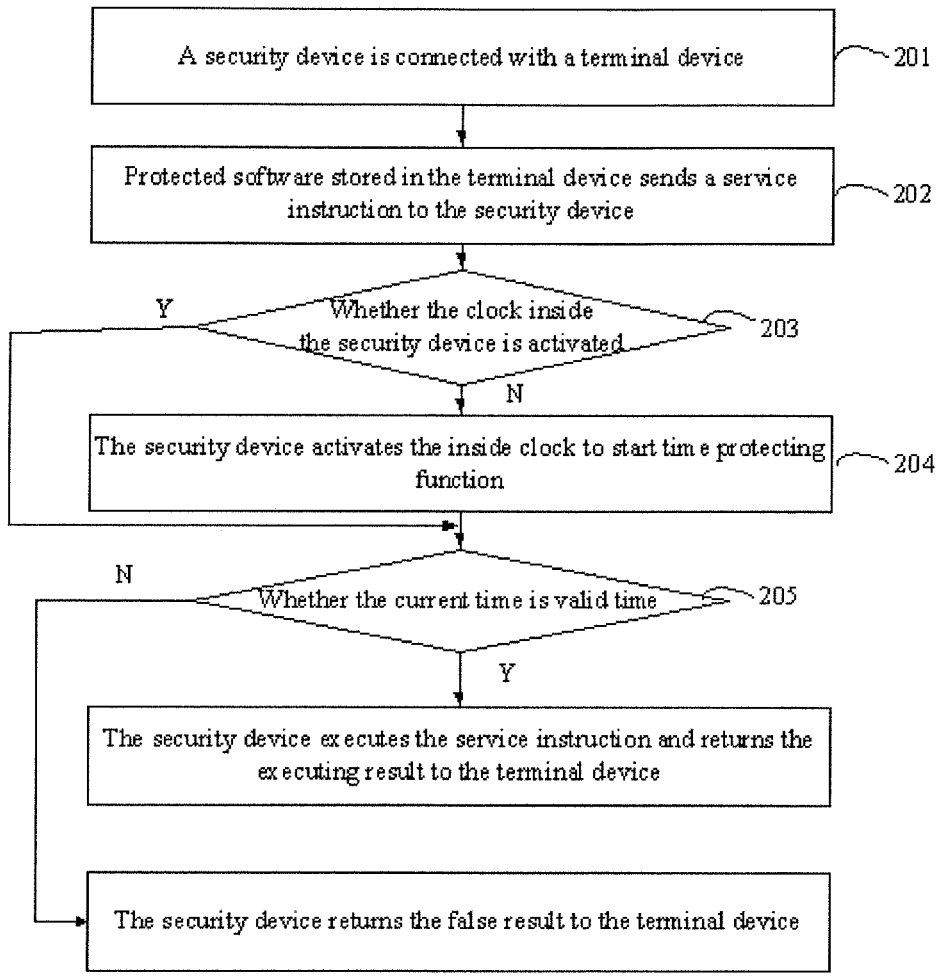
FIG. 2 is a flow chart illustrating a method for protecting software of Embodiment 2 according to the present invention.

The embodiment 2 provides a method for protecting software. Referring to FIG. 2, the method includes the following steps.

Step 201, a security device is connected with a terminal device;

In the embodiment 2, the security device is a token. The token includes a clock which is powered up by a battery. The clock is calibrated at the time of leaving a factory, which makes the time and date of the clock to be accurate and reliable. In addition, one or more pieces of time limit information can be set up before the token leaves the factory. The time limit information is used by the token to implement time protecting function for the protected software. The time protection function is not activated before the token leaves the factory. Only if the token receives a service instruction sent from the terminal device after the token is connected with the terminal device, can the time protecting function be activated. The service instruction is predetermined by the token manufacturer and the terminal device manufacturer before the token leaves the factory.

In the embodiment 2, the time limit information can be that the protected software can only use the token before the expiring date, for example, Dec. 31, 2010; or the time limit information can be that the protected software can only use the token at the specified time interval, for example, from 8:00 a.m to 5:00 p.m, on some day.

The terminal device can be a computer, a card reader with power, RF card reader or any device that can use the token above.

Step 202, the protected software stored in the terminal device sends a service instruction to the security device;

The protected software refers to the software, of which a part of or all of the functions are modified or encrypted. In addition, the protected software can send service instruction to the security device automatically or the service instructions can be manually sent to the security device when the protected software starts protection function.

The service instruction is predetermined by the security device and the terminal device. It can be any one of several predetermined instructions. For example, the service instruction can be a communication instruction for the terminal device and the security device, such as APDU instruction 80 10 00 00 00; and the service instruction also can be program start instruction and/or function algorithm instruction.

Furthermore, the protected software of the terminal device can send encrypted service instructions to the security device. The encryption algorithm includes, but is not limit to, AES (Advanced Encryption Standard) or DES (Data Encryption Standard) etc.

Step 203, the security device receives the service instruction from the terminal device and determines whether the clock inside the security device is activated, that is, determines whether the clock starts the time protecting function;

If the clock inside the security device is not activated, go to Step 204; and

If the clock inside the security device is activated, go to Step 205.

Thereby, if the security device receives an encrypted service instruction, the security device decrypts the service instruction with the predetermined decryption algorithm. The predetermined algorithm includes but is not limit to AES algorithm or DES algorithm, etc.

It should be noted that the security device can calibrate its current time with the clock of the terminal device by the received service instruction.

In Step 203, the method of determining whether the clock starts time protecting function includes determining whether the activation flag is activation indicator (activated);

if the activation flag is not activation indicator (not activated), it is indicated that the clock does not start time protecting function; and if the activation flag is activation indicator (activated), it is indicated that the clock starts the time protecting function;

Step 204, the security device activates the internal clock to start time the protecting function and modifies the activation flag of the clock to be activation indicator (activated).

It should be noted that if the clock of the security device is activated, only if the protected software stops using the security device actively or the time reaches the expiring time of the security device, can the clock stops working. If the clock is forced to stop working, the security device will be destroyed and be instructed to return the information that the security device is destroyed to the terminal device.

Step 205, the security device reads current time of the clock and determines whether the current time is valid time.

If the current time is valid time, the security device executes the service instruction and returns the executing result to the terminal device; and If the current time is not valid time, the security device returns the false result to the terminal device.

Thereby, the executing result or the false result can be encrypted. The encrypted algorithm includes but is not limited to AES algorithm or DES algorithm;

In addition, the false result can be but is not limited to error or random result or the prompt that the security device is expired.

The following are some methods for determining whether the current time is valid time.

(1) If the time limit information is that the protected software can only use the security device before the expiring time of using the security device, The security device reads current time of the clock and the expiring time in the time limit information and determines whether the current time exceeds the expiring time;

If the current time exceeds the expiring time, the current time is not valid time;

If the current time does not exceed the expiring time, the current time is valid time.

For example, the current time of the clock is Jun. 23, 2009 and the expiring time in the time limit information is Dec. 31, 2010. Because the current time does not exceed the expiring time, the current time is valid time.

(2) If the time limit information is that the protected software can only use the security device at specified time interval;

The security device reads current time of the clock, start time and the expiring time in the time limit information and determines whether the current time is between the start time and the expiring time;

If the current time is between the start time and the expiring time, the current time is valid time;

If the current time is not between the start time and the expiring time, the current time is not valid time.

For example, the current time of the clock is 6:00 a.m, the start time in the time limit information is 8:00 a.m and the expiring time in the time limit information is 5:00 p.m. Because the current time is not between the start time and the expiring time, the current time is not valid.

In the embodiment 2 of the invention, the security device stores time limit information according to which the time of using the security device is limited. The security device is bound with time or date, etc. conveniently and the period of using the security device by the protected software is limited, which provides safer security to the protected software and extends the lifetime of the security device.

Embodiment 3

Figure 3:
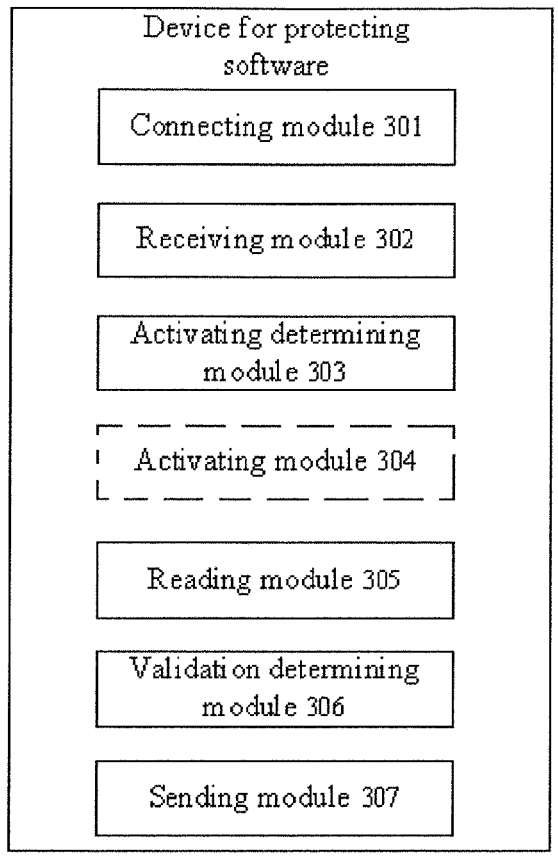
FIG. 3 is a structural diagram illustrating of a device for protecting software of Embodiment 3 according to the present invention.

The embodiment 3 provides a device for protecting software. Referring to FIG. 3, the device includes a connecting module 301 adapted to connect with a terminal device;

a receiving module 302 adapted to receive predetermined service instruction sent from protected software stored in the terminal device;

an activating determining module 303 adapted to determine whether a clock inside the security device is activated;

an activating module 304 adapted to activate the clock if the activating determining module 303 determines that the clock is not activated;

a reading module 305 adapted to read the current time of clock;

a validation determining module 306 adapted to determine whether the current time is valid; and a sending module 307 adapted to send executing result of the predetermined service instruction to the terminal device if the validation determining module 306 determines that the current time is valid; and to send a false result to the terminal device if the validation determining module 306 determines that the current time is not valid, thereby, the false result includes but not limit to error or random result or the prompt that the security device is expired.

The device further includes a decrypting module adapted to, if the service instruction received by the receiving module 302 is encrypted, decrypt the encrypted instruction with predetermined decryption algorithm.

The device further includes an encrypting module adapted to encrypt the executing result or false result;

Correspondingly, the sending module 307 adapted to return the encrypted executing result or false result to the terminal device.

The activation determining module 303 is adapted to determine whether the activation flag of the clock is activation indicator;

If the activation flag of the clock is activation indicator, the clock is activated; and If the activation flag of the clock is not activation indicator, the clock is not activated.

In one embodiment, the activating module 304 specifically includes a connecting unit adapted to connect the clock chip of the clock with battery;

a time counting unit adapted to supply power to the clock by battery and start counting time by the clock;

a modifying unit adapted to modify the activation flag of the clock to be the activation indicator; and a setting unit adapted to set the time status value of the clock to be the start time of the clock.

In another embodiment, the activating module 304 specifically includes a control unit adapted to control the clock oscillator to make the clock to start working;

a time counting unit adapted to enable the power-off pin of the clock; the clock starts counting time;

a modifying unit adapted to modify the activation flag of the clock to be activation indicator; and a setting unit adapted to set the time status value of the clock to be the start time of the clock;

the setting unit further adapted to set expiring time according to the time status value and the time limit information.

In another embodiment, the activating module 304 specifically includes a starting unit adapted to start time protecting function of the clock; and a modifying unit adapted to modify the activation flag of the clock to be activation indicator.

In one embodiment, the validation determining module 306 specially includes a reading unit adapted to read the current time and the expiring time of the clock; and a determining unit adapted to determine whether the current time of the clock overpasses the expiring time;

if the current time of the clock overpasses the expiring time, the determining unit determines that the current time is not valid; and if the current time of the clock does not overpass the expiring time, the determining unit determines that the current time is valid.

In another embodiment, the validation determining module 306 specifically includes a reading unit adapted to read the start time, the current time of the clock and the predetermine time length in the time limit information;

a calculating unit adapted to calculate difference between the current time and the start time; and a determining unit adapted to determine whether the difference is less than the time length predetermined in the time limit information;

if the difference is less than the time length predetermined in the time limit information, the determining unit determines that current time is valid; and if the difference is not less than the time length predetermined in the time limit information, the determining unit determines that current time is not valid.

In another embodiment, the validation determining module 306 specifically includes a reading unit adapted to read the current time of the clock and the expiring date predetermined in the time limit information; and a determining unit adapted to determine whether the current time of the clock overpasses the expiring date predetermined in the time limit information;

if the clock overpasses the expiring date predetermined in the time limit information, the determining unit determines that the current time is not valid; and if the clock does not overpass the expiring date predetermined in the time limit information, the determining unit determines that the current time is valid.

In another embodiment, the validation determining module 306 specifically includes a reading unit adapted to read current time of the clock and time interval predetermined in the time limit information; and a determining unit adapted to determine whether the current time is within the time interval;

if the current time is within the time interval, the current time is valid; and if the current time is not within the time interval, the current time is not valid.

In the embodiment 3 of the invention, the security device stores time limit information according to which the time of using the security device is used. The security device is bound with time or date, etc. conveniently and the period of using the security device by the protected software is limited, which provides safer security to the protected software and extends the lifetime of the security device.

Embodiment 4

Figure 4:
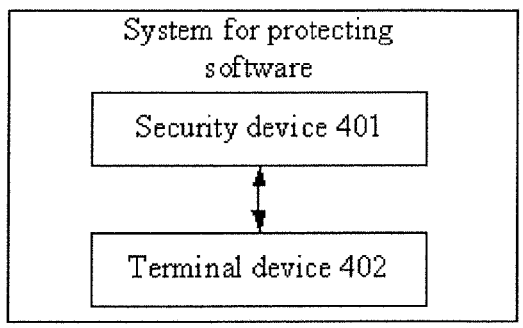
FIG. 4 is a structural diagram illustrating of a system for protecting software of Embodiment 4 according to the present invention.

The embodiment 4 provides a system for protecting software. Referring to FIG. 4, the system includes a security device 401 and a terminal device 402;

Thereby, the security device 401 can refer to device for protecting software in embodiment 2. No further repeat information is given here.

The terminal device 402 includes an interface module adapted to connect with the connecting module of the terminal device;

a sending module adapted to send a predetermined service instruction to the security device; and a receiving module adapted to receive executing result of the predetermined service instruction or a false result send by the security device, thereby, the false result includes but not limit to error or random result or the prompt that the security device is expired.

The terminal device 402 further includes an encrypting module adapted to encrypt the service instruction;

correspondingly, the sending module of the terminal device 402 further adapted to send encrypted service instruction to the security device.

The terminal device 402 further includes a decrypting module adapted to decrypt the encrypted executing result of the predetermined service instruction or a false result if the receiving module receives encrypted executing result or encrypted false result.

In the embodiment 4 of the invention, the security device stores time limit information according to which the time of using the security device is limited. The security device is bound with time or date, etc. conveniently and the period of using the security device by the protected software is limited, which provides safer security to the protected software and extends the lifetime of the security device.

The presently disclosed embodiments should be considered in all respects to be illustrative and not restrictive. The scope of the invention is indicated by the appended claims rather than the foregoing description, and all variations which come within the meaning and range of equivalents thereof are intended to be embraced therein.

The invention claimed is:

1. A method for protecting software on a terminal device by using a security device, the method comprises:

providing the security device including a clock which is powered up by a battery only if the security device receives a predetermined service instruction from the terminal device wherein if the clock is not powered up by the battery, the clock does not start counting time; if the clock is powered up by the battery, the clock starts counting time;

connecting the security device, in which time limit information limits using time of the security device is stored, to the terminal device;

sending, by a protected software stored in the terminal device, the predetermined service instruction to the security device; and receiving, by the security device, the predetermined service instruction and determining whether the clock inside the security device is activated;

if the clock is not activated, activating the clock, reading a current time of the clock and determining whether the current time is valid by the security device;

if the current time is valid, executing the predetermined service instruction and returning an executing result to the terminal device by the security device;

if the current time is not valid, returning a false result to the terminal device by the security device;

if the clock is activated, reading the current time of the clock and determining whether the current time is valid by the security device;

if the current time is valid, executing the predetermined service instruction and returning an executing result to the terminal device by the security device; and if the current time is not valid, returning the false result to the terminal device by the security device, whereby the software being protected by the security device when the security device sends the false result to the terminal device;

wherein activating the clock by the security device comprises connecting, by the security device, a clock chip of the clock with battery, controlling, by the security device, a clock oscillator of the clock to make the clock to start working, enabling a power-off pin and making the clock starting counting time and modifying activation flag of the clock to be activated.

2. The method of claim 1, wherein determining whether the clock inside the security device is activated comprises determining, by the security device, whether the activation flag of the clock is activated;

if the activation flag of the clock is activated, indicating that the clock is activated;
if the activation flag of the clock is not activated, indicating that the clock is not activated.

3. The method of claim 1, wherein determining whether the current time is valid comprises
reading, by the security device, the current time of the clock and a set expiring time; and
determining whether the current time overpasses the expiring time;
if the current time overpasses the expiring time, the current time is not valid;
if the current time does not overpass the expiring time, the current time is valid.

4. The method of claim 1, wherein determining whether the current time is valid comprises
reading, by the security device, the start time of the clock, current time of the clock, and the time length set in the time limit information;
calculating the difference between the current time and the start time; and
determining whether the difference is less than the time length set in the time limit information;
if the difference is less than the time length, the current time is valid;
if the difference is not less than the time length, the current time is not valid.

5. The method of claim 1, wherein activating the clock by the security device comprises
starting, by the security device, time protecting function of the clock; and
modifying the activation flag of the clock to be activated.

6. The method of claim 5, wherein determining whether the current time is valid comprises
reading, by the security device, the current time of the clock and expiring date set in the time limit information; and
determining whether the current time of the clock overpasses the expiring date set in the time limit information;
if the current time overpasses the expiring date, the current time is not valid;
if the current time does not overpass the expiring date, the current time is valid.

7. The method of claim 5, wherein determining whether the current time is valid comprises
reading, by the security device, the current time of the clock and time interval set in the time limit information; and
determining whether the current time of the clock is within the time interval;
if the current time is within the time interval, the current time is valid;
if the current time is not within the time interval, the current time is not valid.

8. A security device for protecting software on a terminal device by using the security device, the security device comprises:
a clock which is powered up by a battery and starts counting time only if the security device receives a predetermined service instruction from a terminal device
wherein if the clock is not powered up by the battery, the clock does not start counting time; if the clock is powered up by the battery, the clock starts counting time;
a connecting module adapted to connect with the terminal device;
a receiving module adapted to receive the predetermined service instruction sent from a protected software stored in the terminal device;
an activating determining module adapted to determine whether the clock inside the security device is activated;
an activating module adapted to activate the clock if the activating determining module determines that the clock is not activated;
a reading module adapted to read a current time of clock;
a validation determining module adapted to determine whether the current time is valid; and
sending module adapted to send an executing result to the terminal device if the validation determining module determines that the current time is valid, or to send a false result to the terminal device if the validation determining module determines that the current time is not valid, whereby the software being protected by the security device when the security device sends the false result to the terminal device;
wherein the activating module comprises
a connecting unit adapted to connect a clock chip of the clock with battery, and control a clock oscillator to make the clock to start working;
a time counting unit adapted to enable a power-off pin of the clock and make the clock to start counting time;
a modifying unit adapted to modify activation flag of the clock to be activated.

9. The device of claim 8, wherein the activation determining module is adapted to determine whether the activation flag of the clock is activated;
if the activation flag of the clock is activated, the clock is activated; and
if the activation flag of the clock is not activated, the clock is not activated.

10. The device of claim 8, wherein the validation determining module comprises
a reading unit adapted to read the current time and set an expiring time of the clock; and
a determining unit adapted to determine whether the current time of the clock overpasses the expiring time;
if the current time of the clock overpasses the expiring time, the determining unit determines that the current time is not valid; and
if the current time of the clock does not overpass the expiring time, the determining unit determines that the current time is valid.

11. The device of claim 8, wherein the validation determining module comprises
a reading unit adapted to read the start time, the current time of the clock and a predetermined time length in the time limit information;
a calculating unit adapted to calculate difference between the current time and the start time; and
a determining unit adapted to determine whether the difference is less than the time length predetermined in the time limit information;
if the difference is less than the time length predetermined in the time limit information, the determining unit determines that current time is valid; and
if the difference is not less than the time length predetermined in the time limit information, the determining unit determines that current time is not valid.

12. The device of claim 8, wherein the activating module comprises
a starting unit adapted to start time protecting function of the clock; and a modifying unit adapted to modify the activation flag of the clock to be activated.

13. The device of claim 12, wherein the activating module comprises a reading unit adapted to read the current time of the clock and the expiring data predetermined in the time limit information; and a determining unit adapted to determine whether the current time of the clock overpasses the expiring date predetermined in the time limit information;

if the clock overpasses the expiring date predetermined in the time limit information, the determining unit determines that the current time is not valid; and if the clock does not overpass the expiring date predetermined in the time limit information, the determining unit determines that the current time is valid.

14. The device of claim 12, wherein the activating module comprises a reading unit adapted to read current time of the clock and time interval predetermined in the time limit information; and a determining unit adapted to determine whether the current time is within the time interval;

if the current time is within the time interval, the current time is valid; and if the current time is not within the time interval, the current time is not valid.

15. A system for protecting software on a terminal device by using a security device, the system comprises the security device includes a clock which is powered up by a battery and starts counting time only if the security device receives a predetermined service instruction from the terminal device wherein if the clock is not powered up by the battery, the clock does not start counting time; if the clock is powered up by the battery, the clock starts counting time;

a connecting module adapted to connect with the terminal device;

a receiving module adapted to receive the predetermined service instruction sent from a protected software stored in the terminal device;

an activating determining module adapted to determine whether the clock inside the security device is activated;

an activating module adapted to activate the clock if the activating determining module determines that the clock is not activated;

a reading module adapted to read the current time of clock;

a validation determining module adapted to determine whether the current time is valid; and a sending module adapted to send an executing result of the predetermined service instruction to the terminal device if the validation determining module determines that the current time is valid; and to send a false result to the terminal device if the validation determining module determines that the current time is not valid, whereby the software being protected by the security device when the security device sends the false result to the terminal device;

the terminal device includes an interface module adapted to connect with the connecting module of the terminal device;

a sending module adapted to send the predetermined service instruction to the security device; and a receiving module adapted to receive the executing result or the false result send by the security device;

wherein the activating module comprises a connecting unit adapted to connect a clock chip of the clock with battery, and control a clock oscillator to make the clock to start working;

a time counting unit adapted to enable a power-off pin of the clock and make the clock to start counting time;

a modifying unit adapted to modify activation flag of the clock to be activated.

* * * * *